(12) United States Patent
Spivey et al.

(10) Patent No.: US 10,063,815 B1
(45) Date of Patent: Aug. 28, 2018

(54) MOBILE COMMUNICATION PLATFORM

(71) Applicants: Kervin R. Spivey, Frederick, MD (US); Jevon L. Spivey, Catonsville, MD (US)

(72) Inventors: Kervin R. Spivey, Frederick, MD (US); Jevon L. Spivey, Catonsville, MD (US)

(73) Assignee: Jenesia1, Inc., Powellsville, NC (US)

( * ) Notice: Subject to any disclaimer, the term of this patent is extended or adjusted under 35 U.S.C. 154(b) by 913 days.

(21) Appl. No.: 13/627,845

(22) Filed: Sep. 26, 2012

Related U.S. Application Data

(60) Provisional application No. 61/539,305, filed on Sep. 26, 2011.

(51) Int. Cl.
*H04N 7/18* (2006.01)
*G08B 13/196* (2006.01)

(52) U.S. Cl.
CPC .................................. *H04N 7/185* (2013.01)

(58) Field of Classification Search
USPC ....................................................... 455/238.1
See application file for complete search history.

(56) References Cited

U.S. PATENT DOCUMENTS

| | | | | |
|---|---|---|---|---|
| 3,796,457 A | * | 3/1974 | Hinchliff | B60P 3/04 296/182.1 |
| 5,102,185 A | * | 4/1992 | Lake | B60J 7/1621 296/100.07 |
| 5,225,761 A | * | 7/1993 | Albright | H02J 7/1423 320/117 |
| 5,531,497 A | * | 7/1996 | Cheng | B60J 7/061 296/100.01 |
| 5,565,828 A | * | 10/1996 | Flohr | H01H 71/1045 218/1 |
| 5,897,158 A | * | 4/1999 | Henke | B60P 3/14 293/128 |

(Continued)

OTHER PUBLICATIONS

Spacenet;"Spacenet Emergency Communications Vehicle . . . "; (2007); pp. 1-4.

(Continued)

*Primary Examiner* — William C Vaughn, Jr.
*Assistant Examiner* — Stuart Bennett
(74) *Attorney, Agent, or Firm* — Perkins Coie LLP

(57) ABSTRACT

A communication vehicle system or platform that provides for the integration of multiple audio, visual, telecommunications, thermal, radiological, chemical and biological data detection and/or communication devices. The communication vehicle can be configured for providing mobile communications and surveillance in an environment in which the surrounding communications and/or power infrastructure has been damaged or is non-existent. For example, the vehicle can be deployed to the scene of a disaster or emergency. Accordingly, the mobility of the preferred communication vehicle can enhance and extend the reach of any emergency operations center. Other possible applications include law enforcement surveillance; tactical military command and control; weather and storm chasing; homeland security search and rescue; forward deployment monitoring, news agencies and border patrol. It can be operated in a stand-alone mode or act as a versatile forward-deployable remote vehicle while communicating to a rear command center.

24 Claims, 11 Drawing Sheets

(56) References Cited

U.S. PATENT DOCUMENTS

| | | | | |
|---|---|---|---|---|
| 6,389,895 B2* | 5/2002 | Colarelli | | 73/460 |
| 6,666,712 B1* | 12/2003 | Kramer | | G06F 1/266 |
| | | | | 439/501 |
| 6,677,028 B1* | 1/2004 | Lasch | | B32B 27/40 |
| | | | | 359/529 |
| 6,798,343 B2* | 9/2004 | Carrier | | A62C 27/00 |
| | | | | 340/539.13 |
| 6,831,556 B1* | 12/2004 | Boykin | | H04N 7/181 |
| | | | | 340/539.1 |
| 7,783,055 B2* | 8/2010 | Barath | | G10K 11/1788 |
| | | | | 381/71.3 |
| 2003/0231238 A1 | 12/2003 | Chew et al. | | |
| 2004/0123328 A1* | 6/2004 | Coffey | | G08B 13/19632 |
| | | | | 725/105 |
| 2006/0248827 A1* | 11/2006 | Meeker | | E04H 9/10 |
| | | | | 52/309.15 |
| 2007/0052804 A1* | 3/2007 | Money | | H04N 5/76 |
| | | | | 348/143 |
| 2007/0195939 A1* | 8/2007 | Sink | | B60Q 1/2611 |
| | | | | 379/37 |
| 2007/0236570 A1* | 10/2007 | Sun | | G01S 3/7864 |
| | | | | 348/159 |
| 2009/0027229 A1* | 1/2009 | Fortson | | H04Q 9/00 |
| | | | | 340/870.07 |
| 2009/0097708 A1* | 4/2009 | Mizuta | | G06T 11/00 |
| | | | | 382/103 |
| 2009/0100210 A1* | 4/2009 | Thomas | | H01R 9/03 |
| | | | | 710/316 |
| 2011/0266801 A1* | 11/2011 | Sainio | | B60G 13/02 |
| | | | | 290/48 |
| 2012/0027221 A1* | 2/2012 | Davis | | H04B 1/3822 |
| | | | | 381/86 |

OTHER PUBLICATIONS

Spacenet; "Spacenet Ion"; (2008); pp. 1-2.
Spacenet; "Satellite Services for Public Safety & Emergency Response"; Spacenet Case Study; Missouri Dept. of Transportation.

\* cited by examiner

MOBILE COMMUNICATION PLATFORM

PRIORITY DATA & INCORPORATION BY REFERENCE

This application claims the benefit of U.S. Provisional Application No. 61/539,305, filed Sep. 26, 2011, and entitled "Mobile Communication System," which is incorporated by reference in its entirety. Also incorporated by reference in its entirety is U.S. Ser. No. 13/158,147, filed Jun. 10, 2011, and entitled "Surveillance System Apparatus."

TECHNICAL FIELD

This invention relates generally to a communication platform or system. More specifically, this invention relates to a communication vehicle or mobile communication center, for land, air or water, for the purpose of preferably providing multiple communication platforms, including satellite, Internet, radio, Wi-Fi, wireless and/or cellular over which to communicate audio, visual, thermal, biological, chemical, and/or telecommunication data.

SUMMARY OF THE INVENTION

A preferred embodiment of the invention includes a mobile communication system/platform that provides for integration of multiple audio, visual, thermal, radiological, biological, chemical, telecommunication or other peripheral sampling, recording, collecting or surveillance devices for interface, operation and control from a single controller, such as, for example a laptop computer. The preferred mobile communication system/platform is configured for emergency response, crisis management, military deployment and/or any other situation requiring mobile communication and surveillance to assess, monitor and/or respond to the situation by land, air or water. Accordingly, the preferred mobile communication system is configured for operation in a variety of environmental conditions which may include: (i) variable terrain, such as for example, off road conditions; (ii) variable weather conditions, such as for example, hurricane winds or extreme temperatures, and/or (iii) variable noise conditions. Thus, the preferred mobile communication system is configured to operate subject to variable and/or extreme levels of vibrations, thermal conditions, noise levels, and/or other environmental factors. Moreover, the preferred mobile communication system/platform is configured to operate as a stand alone communication system capable of operation in an environment having limited to non-existent energy sources, such as for example, limited or non-existent fuel source, external electrical power source and/or land-based telecommunications infrastructure.

In one preferred embodiment, a mobile communication system includes a vehicle, a central server; and a telecommunication sub-system installed about the vehicle. The telecommunication sub-system preferably includes a plurality of IP-based devices coupled to the central server. The devices provide for surveillance, recording, and broadcast of video, audio, voice and data; and at least one operating station is coupled to the central server for monitoring, operation and control of the devices.

A preferred embodiment of the subject mobile communication system or platform incorporates commercial off the shelf (COTS) equipment. Such COTS equipment preferably includes a commercially available vehicle in combination with commercially available peripheral devices, for example, satellite broadcast and receiving equipment, Internet/Intranet network equipment, Wi-Fi/Broadband network components, cellular, wireless and/or radio devices; cameras or thermal motion detectors; sensors and/or microphones or other audio/video recording and/or broadcast equipment. Alternatively or in addition to, the system or platform can include any equipment that is capable of interfacing, connecting or integrating with the system or network to provide the various communication services. In one preferred embodiment, the mobile communication system includes a commercially available vehicle having a front cabin and a rear cabin. The preferred commercial vehicle is a two-axle, four-tire pick-up truck in which the front cabin includes a front portion for a driver and at least one passenger and a rear portion for at least one passenger. The rear cabin of the preferred pickup truck includes a truck bed enclosed by a shell or cap disposed about the truck bed. The interior of the rear cabin is preferably lined or coated with a layer of noise and vibration absorbing material having a preferred thickness of ⅛ inch.

The preferred shell is configured for the installation of various peripheral devices of the communication system. In one preferred embodiment, the shell of the rear cabin is fabricated with a frame of structural ribbing having aluminum sheeting secured to the frame. Disposed about the shell are one or more rail systems for mounting of the peripheral devices, such as for example, video, satellite and/or other broadcast and receiving equipment. Further disposed about the shell are preferably one or more recesses or housings to house peripheral devices or more preferably provide input/output ports for connection of the mobile communication system to external networks or systems such as for example, external networks for broadband, Internet, video/audio communication systems or external AC/DC or other power grids or sources, such as for example, solar power sources.

In one embodiment, a mobile communication system includes a vehicle having an enclosure and a telecommunication sub-system including an IP-based network of devices coupled to a central server, the devices providing for surveillance, recording, and broadcast of video, audio, voice and data. A power sub-system powers the telecommunication sub-system. The enclosure is configured to house the central server and the power sub-system, the enclosure including noise shielding material to define an operating noise level within the vehicle of less than 65 dBm.

A preferred embodiment of the subject mobile communication system or platform includes multiple sub-systems including a telecommunication sub-system, an environmental control sub-system and a power sub-system for operation of the telecommunication and environmental control sub-systems. The preferred telecommunication sub-system includes multiple peripheral devices or equipment that provide: (i) recording and/or broadcast capability, including a multiple cameras for motion and still imaging recording, playback and recording; (ii) audio and video telecommunications, including voice over internet video conferencing, internal and external to the vehicle, and wireless radio, including Super High Frequency (SHF) Radio networks; and (iii) wire and wireless data connectivity, including wireless satellite broadband and Wi-Fi (WLAN) with secure encryption.

Another preferred embodiment of the invention includes a power control sub-system that provides for a power supply on-board the vehicle that permits operation of the vehicle, the telecommunication sub-system and environmental controls to provide a communication vehicle that can operate remotely and independently of an external power supply. In one preferred embodiment of the power supply, two DC power supplies are provided including the battery of the vehicle in combination with a battery box. The preferred battery box includes two six-cell car batteries each of approximately 12 volts. The two DC power supplies are preferably coupled to two inverters in which one inverter provides AC power to electrically sensitive telecommunication equipment and the other inverter provides AC power to less electrically sensitive telecommunication equipment. The vehicle battery and battery box are preferably operated in parallel to one another to provide sufficient current to the peripheral devices and equipment of the mobile communication system. Additionally, the vehicle battery and battery box can be isolated from one another.

In one preferred embodiment, the mobile communication system includes a vehicle having a front cabin and a rear cabin with a divider between the front and rear cabin, the front cabin including a front portion and a rear portion, the rear cabin being enclosed. A central server and a telecommunication sub-system is disposed about the vehicle to define an internal network including: a plurality of cameras; at least one broadband terminal; and a plurality of audio and video communication equipment for internal communications within and external communications outside the vehicle. A power sub-system is enclosed within the rear cabin to power the telecommunication sub-system. The power sub-system preferably includes a first DC source and a second DC source operated in parallel, one of the first DC source and second DC source being an engine battery of the vehicle; and at least one inverter coupled to at least one of the first and second DC sources for providing AC power to power at least a portion of the telecommunication sub-system.

BRIEF DESCRIPTIONS OF THE DRAWINGS

The accompanying drawings, which are incorporated herein and constitute part of this specification, illustrate exemplary embodiments of the invention, and, together with the description given above, serve to explain the features of the invention.

DETAILED DESCRIPTION

A preferred mobile communication system or platform is embodied as a mobile communication vehicle for the purpose of providing multiple communication services for the communication of audio, voice, visual and/or other data including telecommunications, thermal, chemical, and/or biological data. More specifically, the preferred communication system provides for: (i) mobile satellite communications; (ii) local mobile phone services; (iii) high speed video broadcasting; (iv) wired and/or wired teleconferencing and internet access; and/or (v) land mobile radio, such as for example, Ultra, Very and/or Super High Frequency radio (UHF, VHF, SHF). In one preferred embodiment, the preferred vehicle provides for VSAT communications while providing, motion, thermal and/or infra-red video surveillance. To provide the multiple forms of audio, visual, and data communication, the preferred communication system includes the following subsystems and/or capabilities: (i) High resolution Thermal/Infra-red Pan/Tilt/Zoom Observation Cameras; (ii) Wireless transmitter/receiver capable of FIPS 140-2 Security encryption or higher; (iii) Broadband Satellite IP Terminal and WLAN Access Point; (iv) Hemispheric view Camera units; (v) Illuminated External Communications and Power Access Hatch; (vi) Video Conferencing; (vii) HF Radio Base Station; (viii) UHF/VHF/SHF Radio; (ix) Fiber optic interface capability; (x) Closed-circuit Vehicle Intercom System; (xi) Forward cabin computing; (xii) Telescopic Mast (Electric); (xiii) Portable Generator; and (xiv) powered/operating sub-systems of the communication all while the vehicle is in motion.

Figure 1:
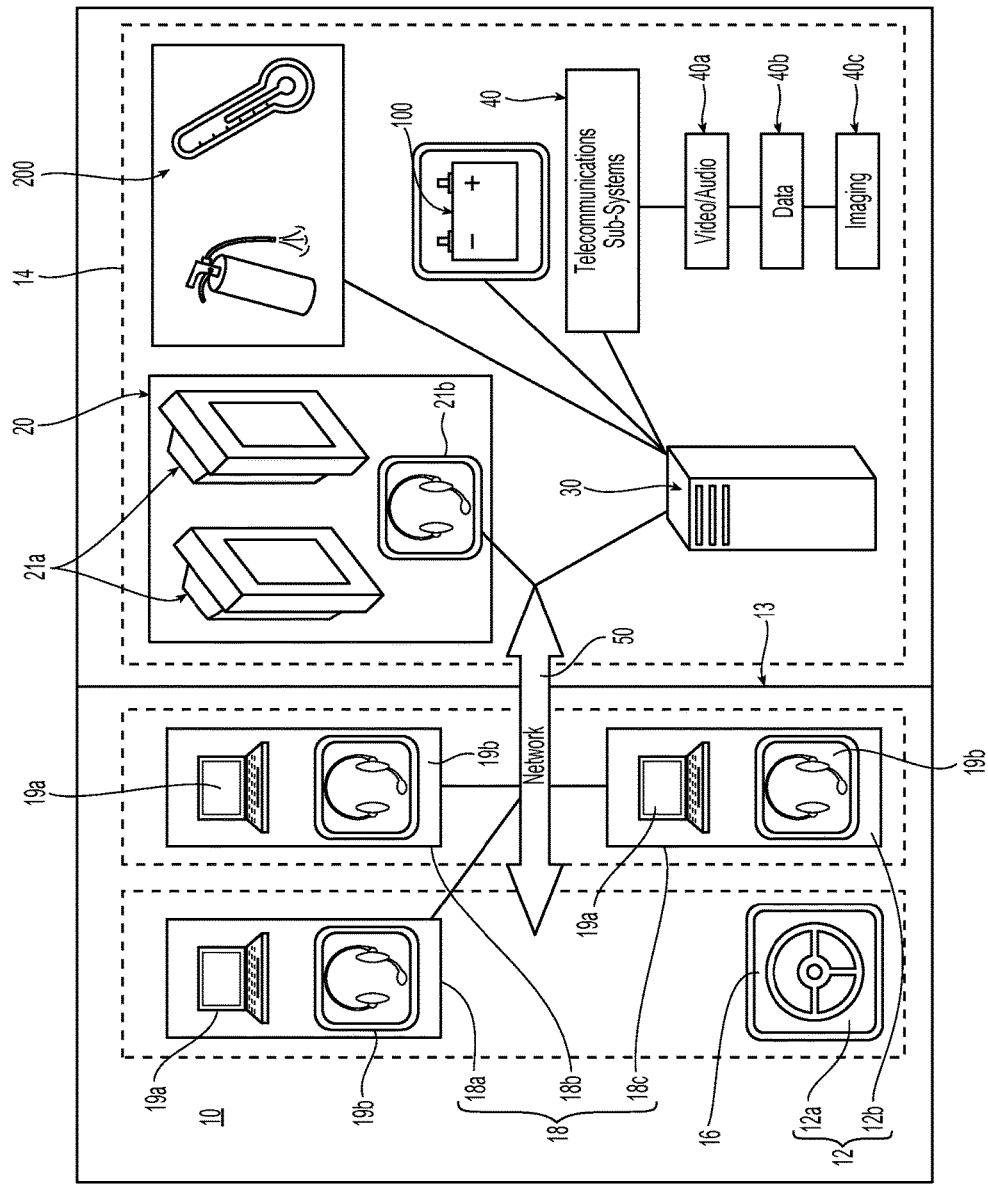
FIG. 1 is a schematic view of a preferred mobile communication system.

Shown schematically in FIG. 1 is a preferred mobile communication system preferably embodied in a land vehicle 10, such as for example, a truck, sports utility vehicle, van or other preferably two-axle, four-wheel passenger or non-passenger vehicle capable of transport and operation of the communication system described herein. Alternatively, the communication system described herein could be applied to other types of multi-axle and multi-tire vehicles or vehicles for alternate modes of transportation, e.g., by air or water. Accordingly, one or more aspects of the preferred systems or platforms and the various subsystems described herein can be incorporated in other types of vehicles, such as for example, boats, ships, water vessels, planes, jets, helicopters, etc., provided the preferred systems are installed in an operative embodiment on board the vehicle to address to provide one or more of the communication and surveillance functions for monitoring or assessment as previously described. Referring to again to FIG. 1, the vehicle 10 is preferably divided into two main sections: a front cabin 12 and a rear cabin 14. The cabins 12, 14 may include one or more operating stations that communicate with one another and with the outside environment over an internal network 50. Preferably disposed within the rear cabin 14 is the network equipment for monitoring, operation and/or control of the peripheral devices of the communication system described in greater detail below. The front and rear cabins 12, 14 are preferably divided by a structural divider 13, such as for example a wall, pane, shield or other dividing member.

The preferred front cabin 12 includes a front portion 12a and a rear portion 12b. The front portion 12a includes a driver's area 16 and preferably a first duty or operating station 18a. The rear portion 12b of the front cabin 12 includes one or more operating stations and preferably includes at least two operation stations 18b, 18c. Each operating station 18 preferably includes a control interface device(s) interconnected over the network 50, such as for example, a laptop computer 19a further preferably in combination with audio/voice telecommunication equipment 19b for interaction and communication with the other operating stations 18a, 18b, 18c, the rear cabin 14 and the environment/entities outside the vehicle 10. Other interface control devices are possible, such as for example, a personal computer, a desktop computer, a workstation, a computer tower, a monitor, a touch screen, a joystick, a keyboard, a switch board, a panel, a smartphone, a tablet or other interface control device.

The preferred rear cabin 14 preferably includes at least one duty or operating station 20 that is connected to the network 50 for interaction with the operating stations 18 of the front cabin 12 in order to, for example, provide information or carry out instructions from anyone of the operating stations of the front cabin. Moreover, the rear cabin operating station 20 includes one or more monitors 21a and preferably at least two monitors for monitoring, operation and/or control of the various subsystems and peripheral devices of the mobile communication system described with greater detail herein. Accordingly, the operating station 20 preferably includes a control interface device as described above, i.e., a computer workstation coupled to the network 50 for monitoring, operating, and/or controlling the peripheral devices. The operating station 20 further preferably includes audio/voice telecommunication equipment 21b for interaction and communication with the other operating stations 18a, 18b, 18c, and/or the environment/entities outside the vehicle 10.

Although the vehicle 10 preferably includes multiple operating stations, the vehicle could be operated by a single operator in which the driver could operate the full capabilities of the preferred mobile communication system from stationary mode or position, and operate one or more portions of the communication system from a mobile mode. With an appropriate number of operators, for example a driver and at least one operator in the rear cabin, the vehicle 10 preferably provides the full capabilities of the mobile communication system in both the stationary mode and the mobile mode. The preferred configuration of the vehicle 10 facilitates use by a crew having a chain of command or other hierarchal organization. More specifically, the front portion 12a of the cabin 12 is preferably configured to accommodate a driver at wheel 16 and a vehicle commander station at operating station 18a. The rear portion 12b of the front cabin 12 can preferably accommodate, for example, an Executive Officer at one operating station 18b and an Operations Officer seated at the other operating station 18c. The preferred rear cabin 14 is preferably configured for accommodating a Communications Officer at the operating station 20. In one preferred configuration of the operating stations 18 in the front cabin 12 will have access to satellite, local video and data communication feeds from the Communications Officer at the rear cabin operating station 12. The audio equipment 19b, 21b are preferably networked as a voice-activated intercom system allowing conversations between the front and rear cabin 12, 14. In one exemplary embodiment, the audio equipment 19b, 21b can include a combination or any one of wired, BLUETOOTH®, or wireless headphones.

Alternatively or in addition to, the communication vehicle 10 can be operated remotely as a stationary surveillance station located at the site to be under surveillance. More specifically, the mobile communication system or platform, its sub-systems, peripheral devices and equipment may be accessed, interfaced with, operated and/or controlled from a remote site such as, for example, a remote command center. The mobile communication system or platform and its associated sub-systems are preferably configured to be IP-based and networked so as to be accessible over a wired or wireless network, such as for example, a broadband satellite network. Accordingly, once the vehicle is in position to record and collect data, no personnel is needed to remain with the vehicle to operate the on-board communication system.

Figure 2:
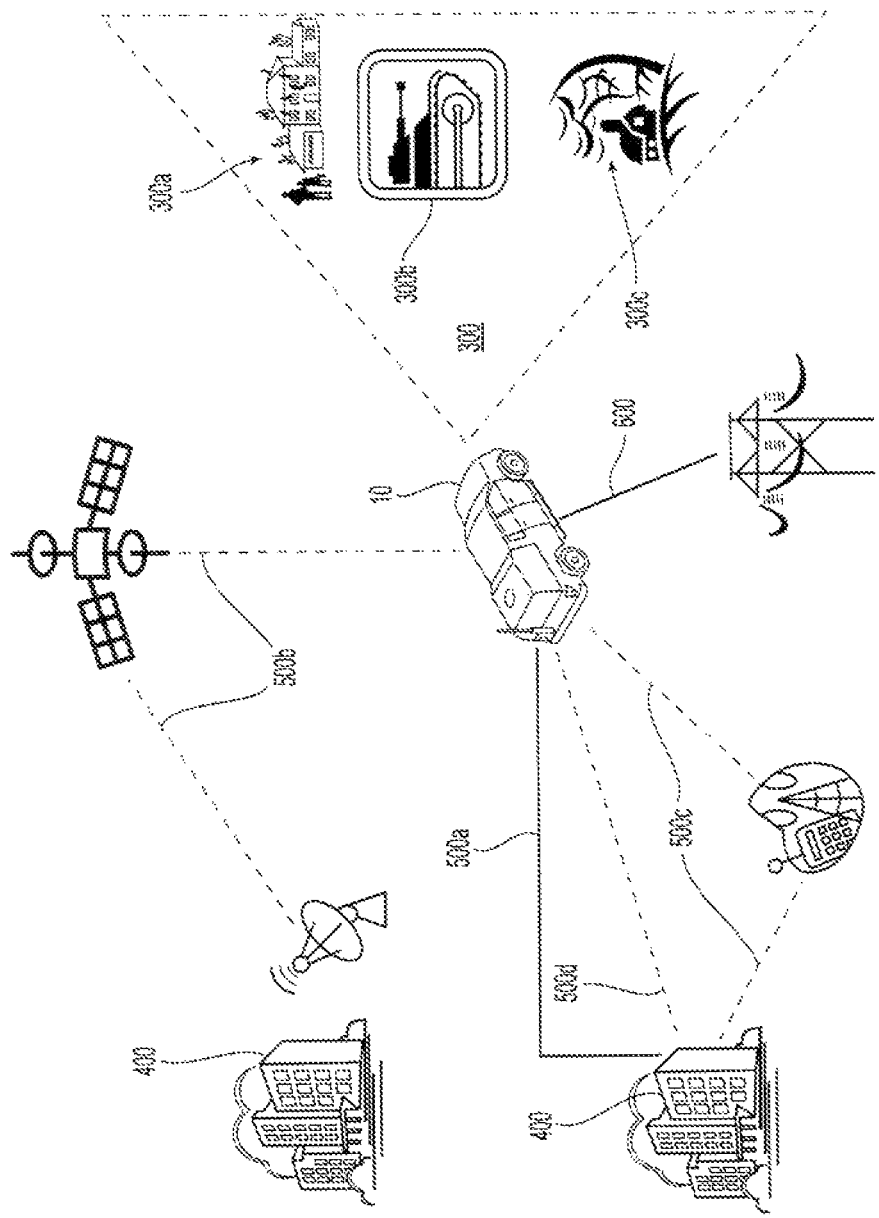
FIG. 2 is a schematic illustration of the preferred operating parameters of the mobile communication system of FIG. 1.

Shown in FIG. 2 is a schematic illustration of the possible applications and operating conditions for the preferred mobile communication vehicle 10. The communication vehicle 10 is preferably configured for providing remote surveillance and communications from the scene of an emergency, crisis, disaster or other hazardous site 300. As illustrated, the vehicle 10 is configured to be deployed to the scene 300 which may be, for example, a fire 300a, a military operation 300b, and/or a natural disaster 300c, such as for example, a hurricane or tornado. The vehicle 10 can be operated in a stand alone mode in which the preferred communication sub-systems and its peripheral devices operate to survey, collect video and audio data, and capture data regarding environmental conditions. In addition or alternatively, the vehicle 10 can be a forward-deployable remote vehicle in communication with a command center 400. The vehicle 10 may have other uses such as, for example, storm chasing, border control, law enforcement surveillance, mobile journalism, social events (parades, fairs, crowd control, etc.)

Whether operating in stand-alone or in forward-deployable remote mode, the communication sub-systems and its peripheral devices of the preferred vehicle 10 can broadcast surveillance information to one or more remote sites, such as for example, the command center 400 or another stationary entity or other land, air or water vehicle. In addition, the operating personnel can communicate with the remote site 400 using on-board, teleconferencing, videoconferencing, and/or Internet based communications, i.e., e-mail, instant messaging, web conferencing. In order to broadcast surveillance information and provide audio, video and data communications, the vehicle 10 preferably includes one or more ports for wired connection 500a to existing communication transmission infrastructure for transmitting video, audio and other telecommunications data. Alternatively or in addition to, the vehicle 10 broadcasts and communicates over a wireless network, such as for example, a satellite network 500b, a cellular network 500c, and/or a wi-fi/wireless LAN or other wireless broadband network 500d. As a remote vehicle 10, the communication system preferably includes an on-board power system for powering the equipment disposed throughout the vehicle. Alternatively or in addition, the vehicle 10 preferably includes one or more ports for connection to a land based power source or electrical grid 600.

As an emergency or natural disaster response mobile communication system, the vehicle 10 may be subject to harsh environmental conditions and/or terrain. Accordingly, the peripheral devices, electronic equipment, and electrical connections forming the communication system are preferably installed, housed, and/or mounted about the vehicle to operate while being subjected to variable and possibly extreme vibration and/or thermal conditions that may result from such harsh environmental and terrain conditions. Additionally, because the vehicle 10 preferably operates in remote areas or disaster sites, the vehicle 10 may not be able to connect to an external power source. Accordingly, the preferred vehicle 10 includes an on-board power system that can power the communication system, its sub-systems, and their peripheral devices.

As a matter of design, fabrication and/or manufacturing the preferred mobile communication system described herein preferably incorporates commercial off the shelf (COTS) equipment to provide for a mobile communication vehicle that can operate under the conditions and environment described herein. Such COTS equipment preferably includes, for example, a commercially available vehicle in combination with commercially available peripheral devices and equipment, for example, satellite broadcast and receiving equipment, Internet/Intranet network equipment, Wi-Fi network components, cellular, wireless and/or radio devices; cameras or thermal motion detectors; and/or microphones or other audio recording equipment. Alternatively or in addition to, the system or platform can include any other computer, telecommunication, audio, visual or sensing peripheral devices or equipment that is capable of interfacing, connecting or integrating with the system or network through either wired connection, wireless connection or both. Additionally, the preferred mobile communication system preferably satisfies one or more known standards, such as for example, MIL-STD-811G (eff. 2000) or later versions, which provides for Secure Wireless Access Bridge DoD Standard for Environmental Engineering Conditions and Laboratory Tests. The preferred mobile communication system also preferably complies with MIL-STD-2036 which provides for guidance in preparation of specifications for electronic equipment for shipboard applications.

In one preferred embodiment of the preferred mobile telecommunication system, the vehicle 10 is preferably a commercially available two-axle, four-tire truck. In one exemplary embodiment, the vehicle 10 is preferably a 2009 TOYOTA TUNDRA® pickup truck, as seen for example, in FIG. 3. The TOYOTA TUNDRA® pick-up truck includes the preferred front cabin 12 having the front and rear portions 12a, 12b as described above. Additionally, the TOYOTA TUNDRA® pick-up truck includes a rear truck bed area that can be enclosed to provide the preferred rear cabin 14 described above. The TOYOTA TUNDRA® pick-up truck provides the vehicle 10 with a preferred payload capacity of 1500 Kg. To provide the desired stability and payload capacity, the wheel and suspension system of the truck can be modified to increase original wheel travel by 30%, include reinforced suspension arms and joints, upgraded shock absorbers to HD Nitrogen system; and/or upgrade the spring rate to payload and sand mobility. The preferred vehicle 10 preferably can withstand typical rough roads, rocky terrain, sand, etc. The preferred vehicle 10 preferably complies with accepted standards, such as for example, MIL-STD-811G when traveling over: (i) paved roads at 100 MPH (miles per hour); (ii) graveled roads at 60 MPH; and/or (iii) Cross Country Roads at 60 MPH. The wheel and suspension further preferably provides for a clearance of at least three feet (3 ft.) to provide a desired clearance in, for example, standing water or snow.

Figure 3:
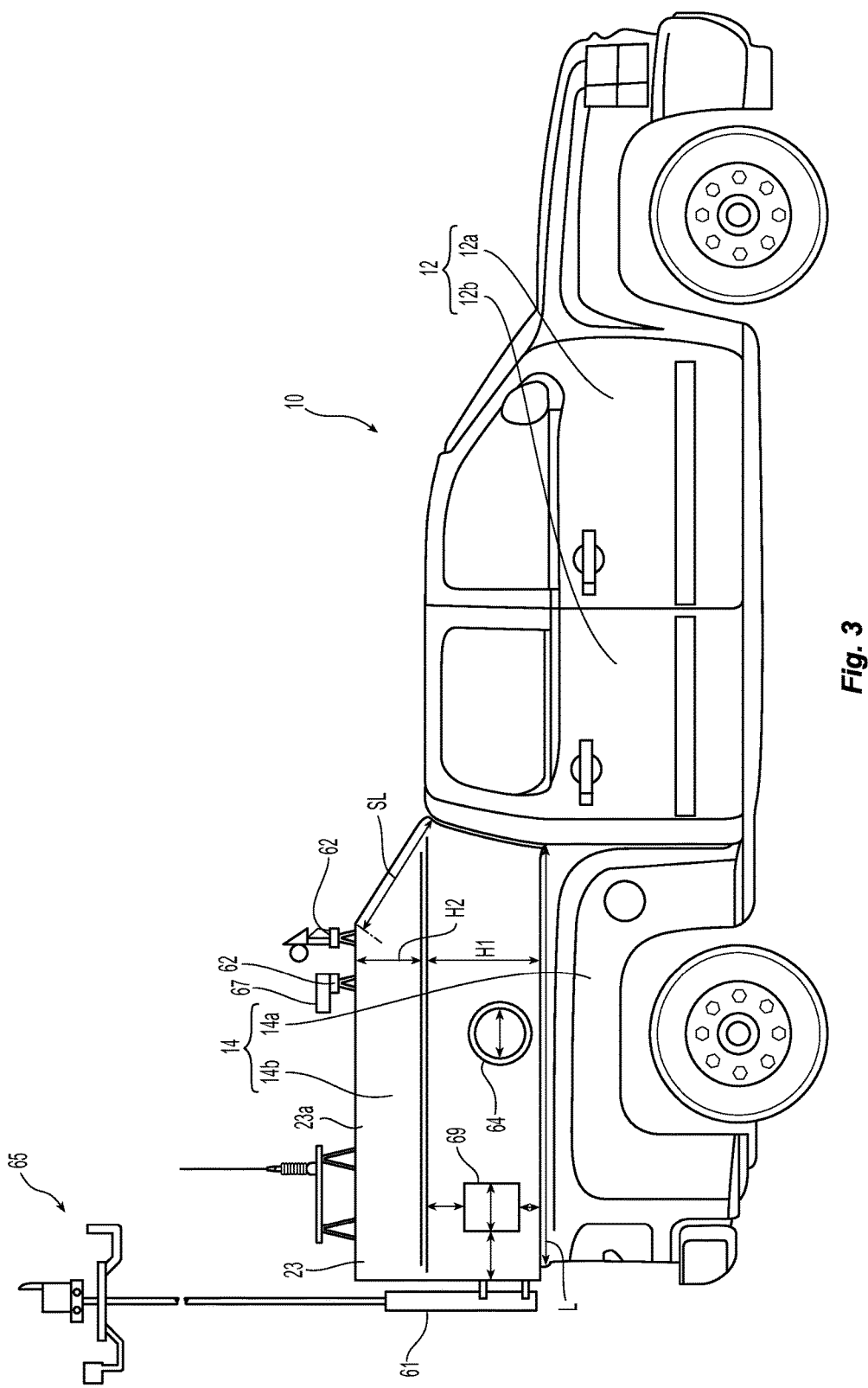
FIG. 3 is a preferred vehicle embodiment of the mobile communication system.
Figure 3A:
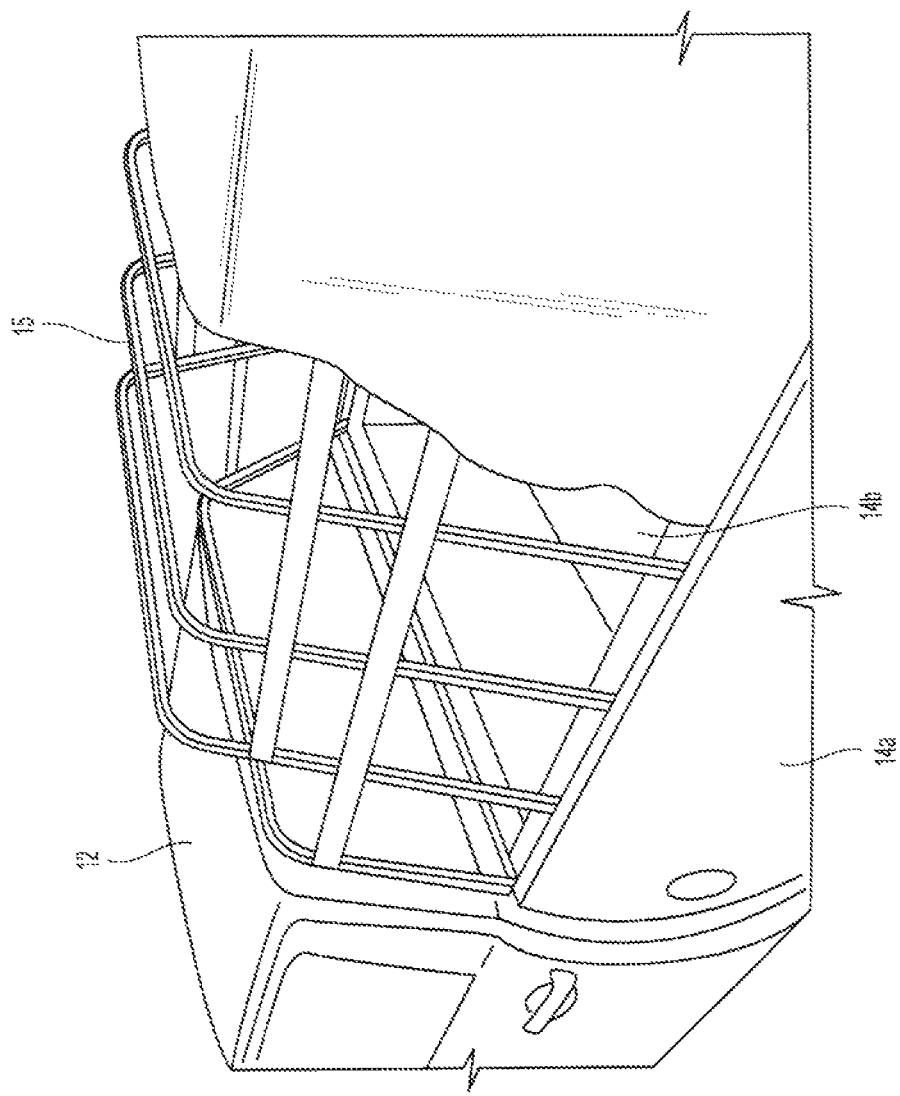
FIG. 3A is a perspective view of a structural frame for the preferred enclosure of a rear cabin of the vehicle of FIG. 3.

With reference to FIG. 3, the preferred rear cabin 14 is preferably defined by an enclosure 14b disposed over the truck bed 14a. The preferred enclosure includes a structural frame 15, as seen in FIG. 3A, having an aluminum sheet covering and secured about the frame. Additionally, the enclosure can be fabricated from a fabric and polyester/epoxy resin. The cabin 14 is further preferably coated to provide additional shielding against vibration and/or noise. For example, any one of the interior or exterior is preferably coated with a flame resistant elastomeric polyurethane spray-on coating to a preferred thickness of about ⅛ inch. The preferred operating noise level within the vehicle 10 is preferably less than 65 dBm ratio (decibels (dB) of the measured power referenced to one milliwatt (mW)) and more preferably less than 63 dBm. The preferred operating noise level generated by the vehicle 10 preferably does not exceed 75 dBA (decibels A-weighted) at a distance of about 7 meters from the vehicle 10. Within the vehicle, the noise level with all sub-systems and equipment powered is preferably no more than about 90 dBm and more preferably no more than about 87 dBm.

The enclosure 14b defines a preferred vehicle height that encloses and supports the equipment of the mobile communication system, and permits operation of the vehicle 10 and its telecommunication system subject to winds of up to 80 MPH. Moreover, the externally mounted equipment or devices of the communication system preferably can withstand winds of up to 100 MPH. In supporting the equipment and peripheral devices of the mobile communication system, the enclosure 14b preferably supports roof mounted equipment, at least one telescopic mast 61, and as necessary any operating personnel. The preferred telescopic mast 61 preferably defines a maximum height which ranges from about 13 feet to about 20 feet (4-6 meters) or more preferably 10 feet to about 70 feet (3-21 meters). The enclosure 14b further preferably includes at least two sets of externally mounted rails 62 for variable mounting of surveillance equipment which is discussed in greater detail below. Mounting recesses, hatches and/or ports are disposed about the enclosure to house and provide access to equipment and devices of the preferred mobile communication system described herein.

Figure 3B:
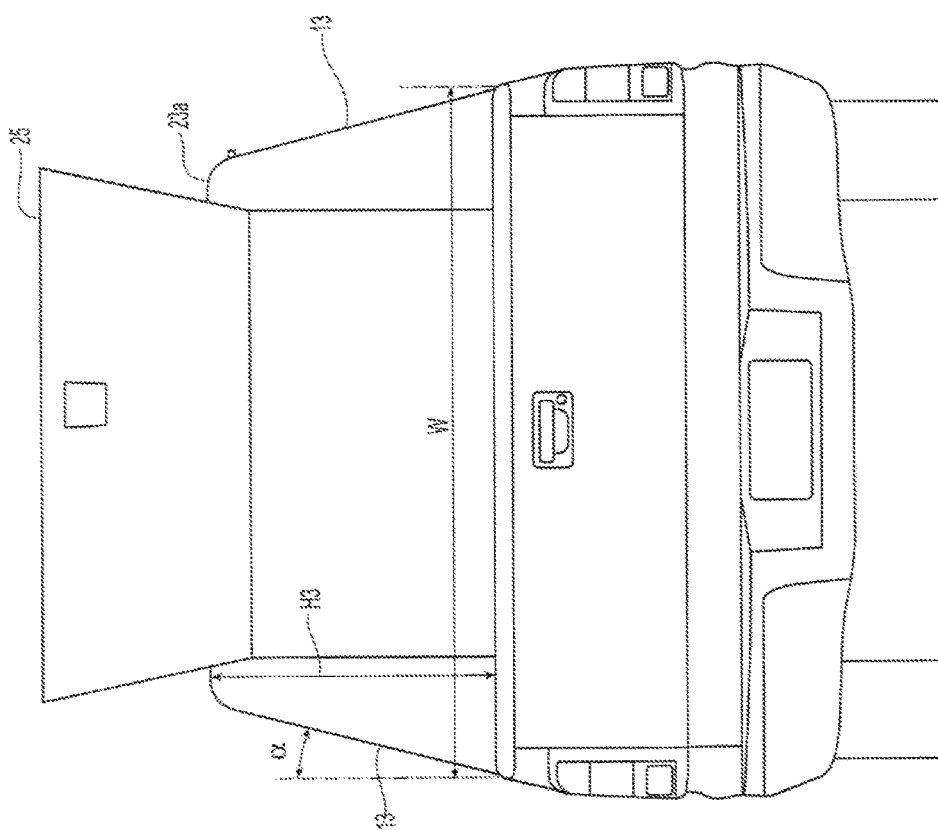
FIG. 3B are dimensioned views of the enclosure of FIG. 3.

Preferred exemplary dimensions of the enclosure 14b are shown in FIGS. 3 and 3B. The enclosure is preferably configured to support the previously described equipment and provide the aerodynamics to permit the vehicle to operate in high speed winds, such as for example, in a hurricane or other storm. The base of the enclosure 14b which is preferably secured atop the sides of the truck bed 14a defines a preferred length L of about seventy inches and more preferably about sixty-seven inches (67 in.) with a width W of about 60 inches. The enclosure preferably includes two side panels 13 which extend at an angle α upward from the sidewall of the truck bed. Preferably, the side panels 13 are angled α at about ten degrees from a vertical relative to the floor of the truck bed. The side panels 13 preferably extend and define the height of the enclosure with a panel height H1 of about two feet from the top of the truck bed sidewalls to the top of the enclosure or the canopy 23. The canopy 23 is disposed atop each of the side panels 13 to define the roof 23a of the vehicle upon which external equipment, as described above, is roof mounted. The canopy 23 adds a height H2 of about one foot, preferably about ten inches (10 in.) and more preferably about eight inches from the side panels 13. Preferably, the enclosure 14b preferably extends vertically from the sidewall of the truck bed 14a at a total height H3 of about thirty inches (30 in.) to the roof 23a of the enclosure 14. Transitioning between the roof 23a of the front cabin 12 of the vehicle 10 and the canopy of the rear cabin enclosure 14b is a sloped portion 23b of the canopy 23 which defines a slope length SL of about 18 inches. As seen in FIG. 3B the enclosure 14b preferably includes a rear hatch 25 that preferably pivots with respect to the canopy.

Figure 4:
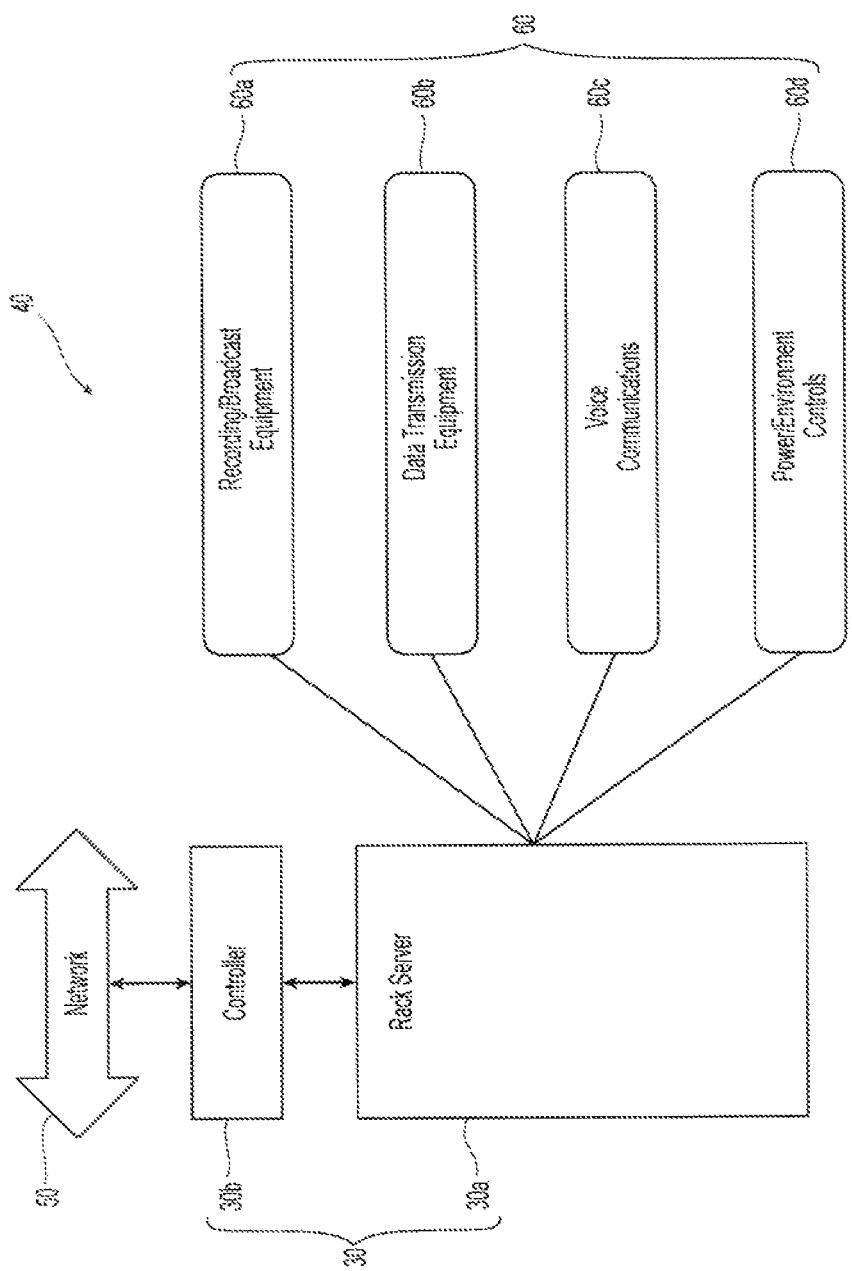
FIG. 4 is a block diagram of a preferred embodiment of the mobile communication system for use in the vehicle of FIG. 3.

As discussed above, the preferred mobile telecommunication system preferably provides audio, voice, and data telecommunications, broadcast and surveillance capability in a vehicle platform. Shown in FIG. 4 is a block diagram of the preferred communication system and its subsystems. As previously noted with respect to FIGS. 1 and 2, the communication system is network based, accessible by the operating stations 18, 20 of the vehicle 10 for broadcast externally to the vehicle to a remote site such as for example, a remote command center. Alternatively, the operating stations, devices and equipment of the mobile communication system may be accessible via the network 50 by a remote operating or command station external to the vehicle.

The preferred communication system has a central control unit 30 that includes a network server, preferably a rack network server 30a and a controller 30b to provide the network 50. As noted previously with reference to FIG. 1, the communication system includes various subsystems for its operation which preferably includes a telecommunication sub-system 40 which comprises video/audio 40a, data 40b, and imaging 40c, an environmental controls subsystem 200, and an on-board power subsystem 100. To interconnect the various subsystems of the mobile communication system for centralized operation and control, the preferred system includes peripheral devices or equipment of the subsystems coupled to the server 30, as schematically shown in FIG. 4. The preferred mobile communication system preferably includes recording/broadcast equipment 60a; data transmission equipment 60b, voice communication equipment 60c; and power/environmental control equipment 60d coupled to the rack server 30 for monitoring, operation and control over the network 50.

In order that all the peripheral devices and/or equipment 60 which define the mobile communication system can communicate with the operating stations 18, 20 over the network 50 via the server 30a and controller 30b for delivery of surveillance and telecommunication data including, for example, HD Video conferencing, the devices 60 are preferably IP-based preferably using universally accepted Transmission Control Protocol (TCP) or higher. Accordingly, for any preferred device described herein that is an analog-based device, the device is coupled to the server 30 by an analog-to-digital converter. Alternatively to employing TCP, the network 50 and the system devices can employ User Data Protocol (UDP). The operating stations 18, 20 interface, access, operate, monitor and/or control the peripheral devices and equipment 60 over the network 50 via an Ethernet connection and/or wirelessly and preferably by desktop control software installed at the interface devices, i.e., laptop 19a at the operating stations 18, 20 to send instructions and or requests to the controller 30b and server 30a. A preferred COTS control software is for MICROSOFT SERVER 2008©, software.

As noted above, the preferred mobile communication system includes COTS equipment for use as the peripheral device 60 of the system. In one preferred embodiment of the mobile telecommunication system, the preferred server 30 includes a self-contained, server controlled computer network, power selectable switch bank, CAT 6 patch/fiber panel, 24 port Ethernet switch and power over Ethernet (POE) port array.

Figure 4A:
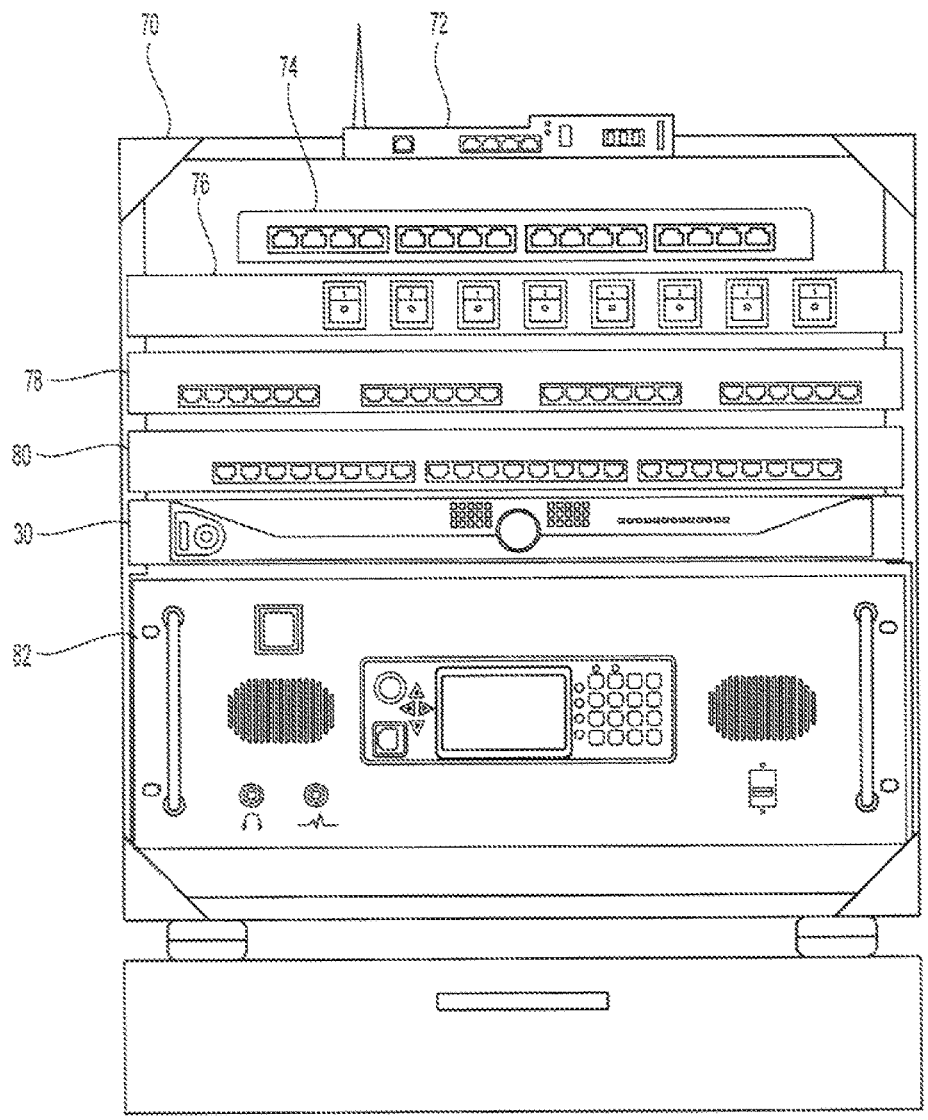
FIG. 4A is a preferred embodiment of a rack server for use in the mobile communication system of FIG. 1.

A preferred arrangement of the server 30 in a preferred rack arrangement is shown in FIG. 4A, a preferred rack frame or enclosure 70 is shown which preferably measures about twenty inches to about twenty-two inches and more preferably about 21.5 inches in height with a preferred width of about twenty inches in width. The rack frame 70 is preferably secured on shock mounts to reduce vibration. The rack arrangement includes a satellite terminal 72 for connection of multiple devices. The satellite terminal preferably includes four Ethernet ports with Power over Ethernet (PoE) and supports analog and Integrated Services Digital Network (ISDN) circuit-switched voice calls along with fax and 64 kbps ISDN data. The preferred rack arrangement further includes a multiple Ethernet port PoE injector 74 for supplying power to a device of the system. More specifically, a 16-Port Ethernet Injector 74 is provided which can provide 10/100 Mbps links and industry standard accepted power such as for example IEEE 802.3af power, to an appropriately configured device. The PoE Injector 74 is preferably configured to discontinue the supply of power in the event a powered device becomes disconnected and further preferably determines for a powered device: the PoE requirements, speed, duplex and cable type.

The preferred rack arrangement further includes a multi-channel power switch 76 for providing power to the equipment of the rack arrangement and/or other devices. The power switch 76 preferably provides multiple-socket, such as for example, eight 120V, three-prong sockets with corresponding toggle switches and a resettable circuit breaker. The power switch is preferably configured for a maximum load: 15 amps or 1800 watts having 120 Volt operation. The preferred rack arrangement further includes a multi-port patch panel 78 and switch 80. The switch 80 is preferably configured to provide support for port-based Virtual Local Area Networks (VLANs) and more particularly supports intra-switch VLANs, which allows for data packets to be forwarded only to those stations within a specific VLAN, thereby creating preferred virtual firewalls between VLANs. The switch 80 is preferably a 24-Port switch and the patch panel is preferably a 24-Port CAT6 Patch/Fiber Panel.

The preferred rack arrangement of FIG. 4A shows the preferred server 30 which preferably includes a 250 watt power supply and is configured for communication of the peripheral devices and/or equipment 60 which define the mobile communication system with the operating stations 18, 20 over the network 50 via the server 30 for delivery and receipt of surveillance and telecommunication data using appropriate data and/or control protocol. The preferred rack arrangement includes a High Frequency (HF) Base Station 82 for radio/data communication, such as for example, a rack mount 125 Watt HF Base Station.

With regard to the recording/broadcast equipment 60a, schematically shown in FIG. 4, the preferred mobile communication system includes one or more cameras, audio recording and other surveillance equipment to capture, record and broadcast video and audio data collected at the site of vehicle 10 operation. More specifically, the telecommunication sub-system of the preferred communication vehicle 10 preferably includes one or more, and more preferably nine, motion video and/or still picture recording/broadcasting sources. Preferably mounted about the exterior of the vehicle 10 are one or more, and more preferably at least three, hemispheric cameras, such as for example, three Q24 hemispheric cameras with one camera 64 mounted on each side of rear cabin enclosure, as seen for example in FIG. 3, and one hemispheric camera mounted at the rear of the vehicle. Accordingly, a hemispherical panoramic view can be provide about any portion of the vehicle 10 with continuous digital zooming and panning. The hemispherical cameras 64 can be configured with an alarm function, speaker and integrated microphone.

Preferably mounted atop the vehicle and more preferably mounted atop the telescopic mast are an array 65 of pan, tilt, zoom (PTZ) day/night cameras with infra-red (IR) sensors. The day/night camera array preferably includes four cameras equiradially disposed about the mast. The day/night camera array provides a 360 degree view about the vehicle over a variable range of height above the vehicle defined by the telescopic range of the mast. Accordingly, the mast has a payload capacity of about fifty pounds (50 lbs.). A preferred day/night array is shown and described in unpublished U.S. patent application Ser. No. 13/158,147, filed on Jun. 10, 2011 and entitled, "Surveillance System Apparatus." Alternatively, the 360 degree view can be provided with a turret mounted ICD camera type CO-13.

As describe in U.S. patent application Ser. No. 13/158,147, a preferred mounting arrangement includes a preferably fixed surveillance device capable of visual, audio, thermal, electrical surveying, imaging and/or recording over a fixed field of view and a movable surveillance device with zoom capability for visual, audio, thermal, electrical surveying, imaging and/or recording of a portion of the field of view such that simultaneous operation of the fixed and the movable surveillance devices eliminates or substantially minimizes the period that any portion of the area under surveillance is unmonitored, i.e., has a dead space. Surveillance devices can include sensors, audio recording and imaging equipment, and preferably includes cameras capable of analog, digital, thermal, and/or infrared imaging and/or recording of images. A preferred movable surveillance device includes a pan, tilt and zoom camera ("PTZ camera") capable of moving and preferably rotating the field of view of the camera over at least two axes or rotation so as to define the direction of pan and tilt.

Figure 6A:
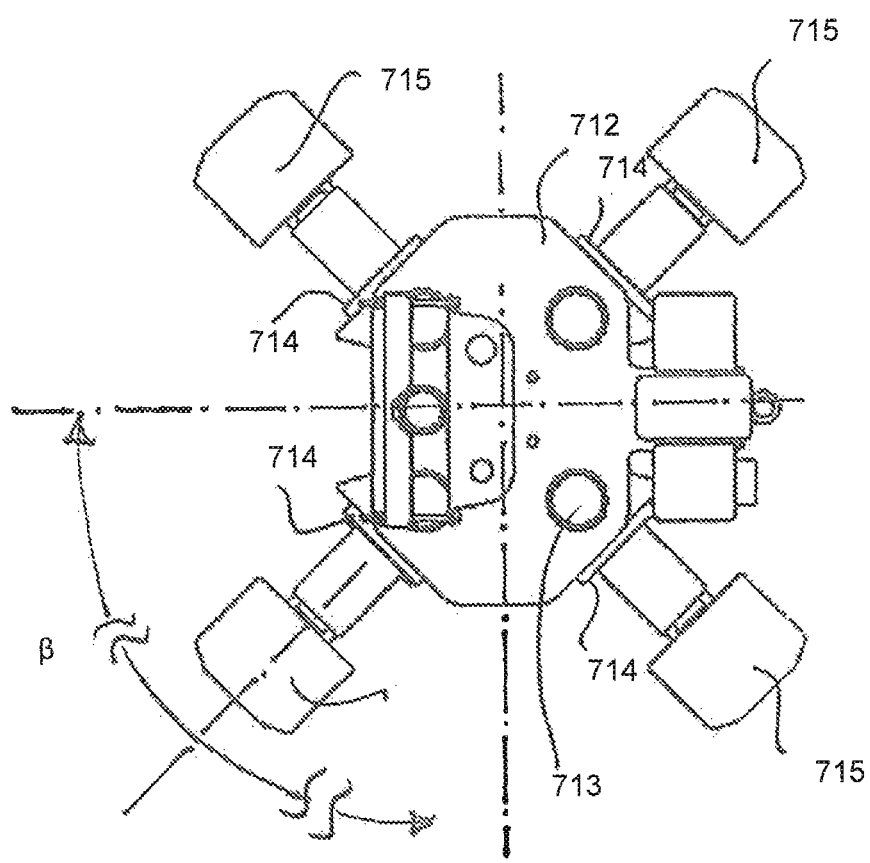
FIGS. 6A-6C are various views of a preferred array of day/night cameras for use with the vehicle of FIG. 3.
Figure 6B:
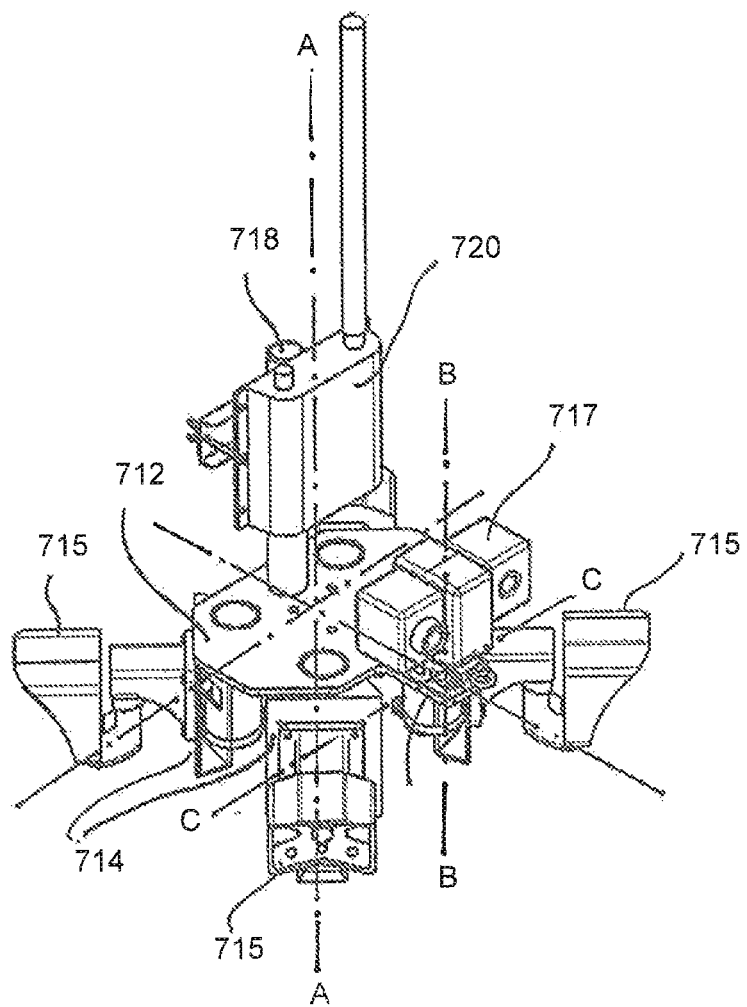
Figure 6C:
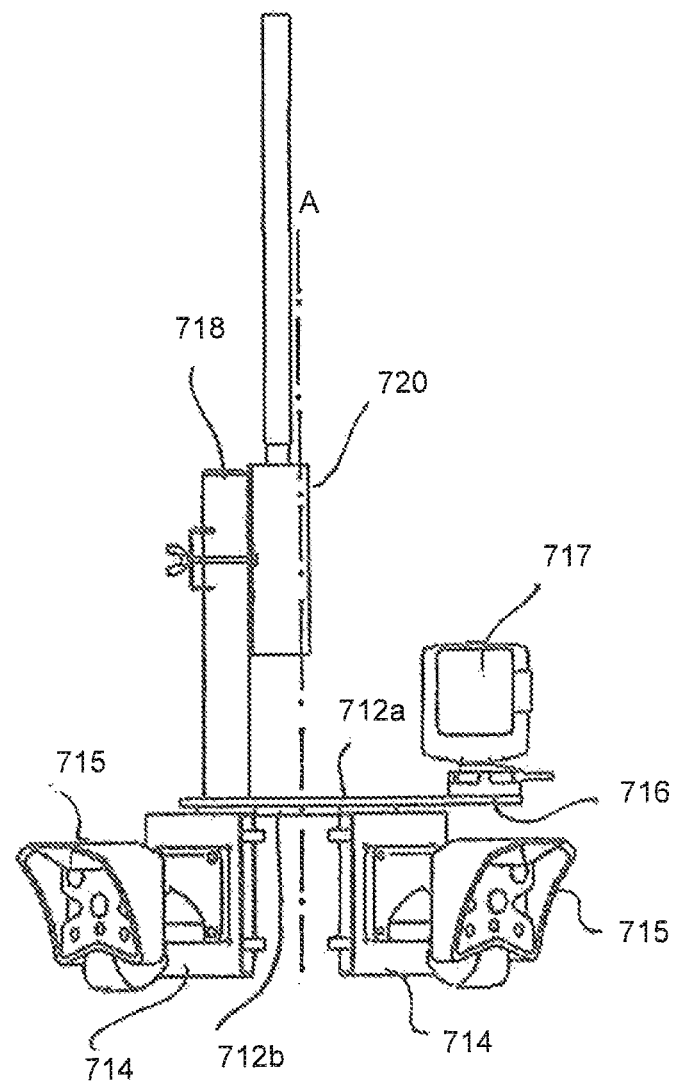

Referring to FIGS. 6A-6C, in one embodiment a frame assembly or apparatus includes a mounting platform 712 that is preferably substantially a flat member having a first upper surface 712a and a second bottom surface 712b. The platform 712 is preferably symmetric in geometry defining a central axis A-A. One or more mounting brackets extend preferably from each of the upper and bottom surface and/or a lateral edge of the platform to mount and support one or more surveillance devices.

Extending from the bottom surface 712b of the platform are two or more legs 714. For example, four 2×7 inch fixed reinforced aluminum legs 714 depend from the bottom surface of the platform 712 equiradially spaced about the central axis A-A. Preferably mounted to each leg 714 is a camera 715 having a fixed field of view, such as for example, a MOBOTIX™ camera. The platform 712 can include one or more through holes 713 through which any or cable can extend for connecting the cameras 715 or other surveillance equipment. The fixed field of view for each camera 715 defines an angular range β over which the camera 715 can survey an area to be monitored. The fixed view cameras 715 are preferably substantially equidistantly spaced from the platform 712. Alternatively, the cameras 715 can have varying spaced distances from the platform 712.

Preferably extending from the upper surface 712a of the platform 712 are a plurality of brackets which preferably include, for example, a 4 inch long by ⅜ inch thick extension arm 716 for preferably mounting a camera 717, such as for example, a PTZ camera at a radial distance from the central axis A-A. More preferably, the extension arm 716 extends laterally from an edge of the platform 712 to support the camera 717 such that the camera 717 is substantially located above and centered between two of the fixed field of view cameras 715. The extension arm 716 may be affixed to the platform 712 or alternatively may be formed integrally with the platform 712. The camera 717 is preferably mounted so as to pivot about a first axis B-B and pivot or tilt about at least a second axis C-C. In addition, the camera 717 includes a zoom capability so as to provide a mutable view preferably about the central axis A-A. Further preferably extending from the upper surface of the platform 712 is a 13 inch long by 1 inch wide fixed upright radio mounting neck 718, which can hold a radio 720 that can provide wireless mobile communications between the operator and the security system. For example, the radio can be a wireless bridge 720 mounted to the neck 718 for communication with or coupled to the cameras 715, 717 to provide real time wireless remote control of the cameras and continuous visual wireless feed from each of the cameras 715, 717.

Further preferably installed atop the array of day/night cameras are one or more thermal and color cameras such as, for example, DUAL i50 Thermal and Color camera from RVISION, INC. Preferably mounted atop the enclosure of the rear cabin 14b is a sidewinder color camera. Each of the above-described cameras, including the drive for the telescopic mast, are coupled to the network 50 by way of the server 30 for monitoring operation and/or control by any one of the operating stations coupled to the network 50 to provide the desired views, surveillance, and images captured by the cameras.

Other surveillance or sensors may be mounted about the vehicle 10 and coupled to the network 50 for access, monitoring, control and operation by any one of the operating stations. For example, the vehicle 10 can include directional finders, GPS, weather monitoring equipment, and/or other thermal, chemical, radiological or biological sensors, sampling and/or testing equipment. An exemplary sensor for use in the preferred system is the "AreaRAE Gamma: Wireless, Multi-channel, Compact and Easily Transportable Multi-gas and Radiation Monitor" from RAE SYSTEMS® and described in data sheet DS-1002-01, which is incorporated by reference in its entirety. The preferred sensors preferably interface with the network 50 wired, wirelessly or both for transmission of data to and from one or more of the operating stations.

The voice communications equipment 60c of the telecommunication sub-system provides for both internal communications between the operating stations of the vehicle 10 and external communications with remote sites to the vehicle. For example, in one preferred embodiment, the voice communications equipment 60 includes one or more IP-based video conferencing telephones capable of wired or wireless communication with anywhere in the world. The preferred internal communications of the vehicle 10 include intercom headsets 19b, 21b, which can be wired, wireless, e.g., BLUETOOTH®, or both at each operating station 18, 20 integrated with the network 50 to provide teleconferencing and internal command and control communications. External, and preferably wireless, communication is provided by one or more radios. For example, installed within the vehicle 10 is preferably a RM-125 High Frequency (HF) Radio with secure access code frequency modification. Alternatively or in addition to, the voice communications equipment 60 can include a TRI-Band UHF/VHF/SHF Radio configured for digital system integration with the network 50.

Associated with the each of the recording/broadcast equipment 60a and the voice communication equipment 60c is data transmission equipment 60b to provide the vehicle 10 with internal wired and wireless connectivity, external wired and wireless connectivity for internal/external communication and broadcast capability. With regard to the wireless capability of the preferred vehicle 10, the preferred telecommunications sub-system includes a broadband satellite terminal (BGAN) 67 with a Wi-Fi access point and a WLAN/WiMax transceiver preferably with FIPS 140-2 security or higher. One preferred embodiment of the transmission equipment 60b includes a HUGHES® 9450-C11 BGAN mobile satellite terminal mounted atop the vehicle 10 and coupled to the network 50 to provide a broadband satellite IP terminal and a (WLAN Wi-FI) Hot Spot access point for wireless access to the Internet/Intranet for data transmission to and from the vehicle 10. In addition or alternatively to, the preferred transmission equipment 60 includes a wireless radio system having a wireless link tower with an integral antenna coupled to preferably two wireless Indoor Units (IDU) coupled to the server 30.

In addition to the wireless connectivity of the vehicle 10, the data transmission equipment 60b of the telecommunication subsystem preferably includes an external communication hatch 69 disposed along the outside of the vehicle 10 to provide one or more ports for wired (fiber optic and/or Ethernet) connection between the network 50 and an external broadband, DSL, dial-up or other Internet connection. Where applicable, an external fiber optic interface (Ethernet to Fiber Optic Converter) can be provided to extend the distance of the Ethernet signal (10/100/1000BaseT) to over 12 miles by use of a fiber optic cable. Alternatively or in addition to, the external communication hatch can include a port configured as an RCA Jack for audio or video input. The external communication hatch provides for the wired communications, as schematically illustrated at 500a in FIG. 2. Accordingly while stationary, the preferred vehicle's Internet and/or radio feed can be extended by either a physical (wired) network connection or a secure wireless network, that is preferably capable of FIPS 140-2 level encryption or higher.

Given the configuration of the preferred vehicle 10 and the possible range of environments in which the vehicle 10 is to operate, the preferred mobile communication system includes an environmental control sub-system 200 as seen schematically, for example in FIG. 1. The preferred environmental control sub-system is defined by the power/environmental control equipment 60d. In one embodiment of the mobile communication system or platform, fire protection equipment and HVAC equipment is provided. To minimize the power requirements, the fire protection equipment is preferably a CO2 dry chemical fire extinguisher and the HVAC equipment preferably includes a 7,000 BTU air conditioner with capacity to provide temperature control of an area of about 250 square feet to maintain a desired temperature ranging between from about 60-90 degrees Fahrenheit.

As schematically shown in FIG. 1, the mobile communication system or platform includes a power control sub-system 100 to power the other sub-systems 40, 200. With reference to FIG. 2, the preferred vehicle 10 can be coupled to an external power source 600, such as for example, an external generator, an external AC line or other external power source, such as for example a solar power source. Accordingly for example, when the vehicle 10 is in a stationary mode, the vehicle 10 can be coupled to a solar power system, station or array. In one preferred embodiment, the vehicle 10 the preferred external communication hatch described above can include a port for coupling to a residential, a commercial or other available power supply.

Figure 5:
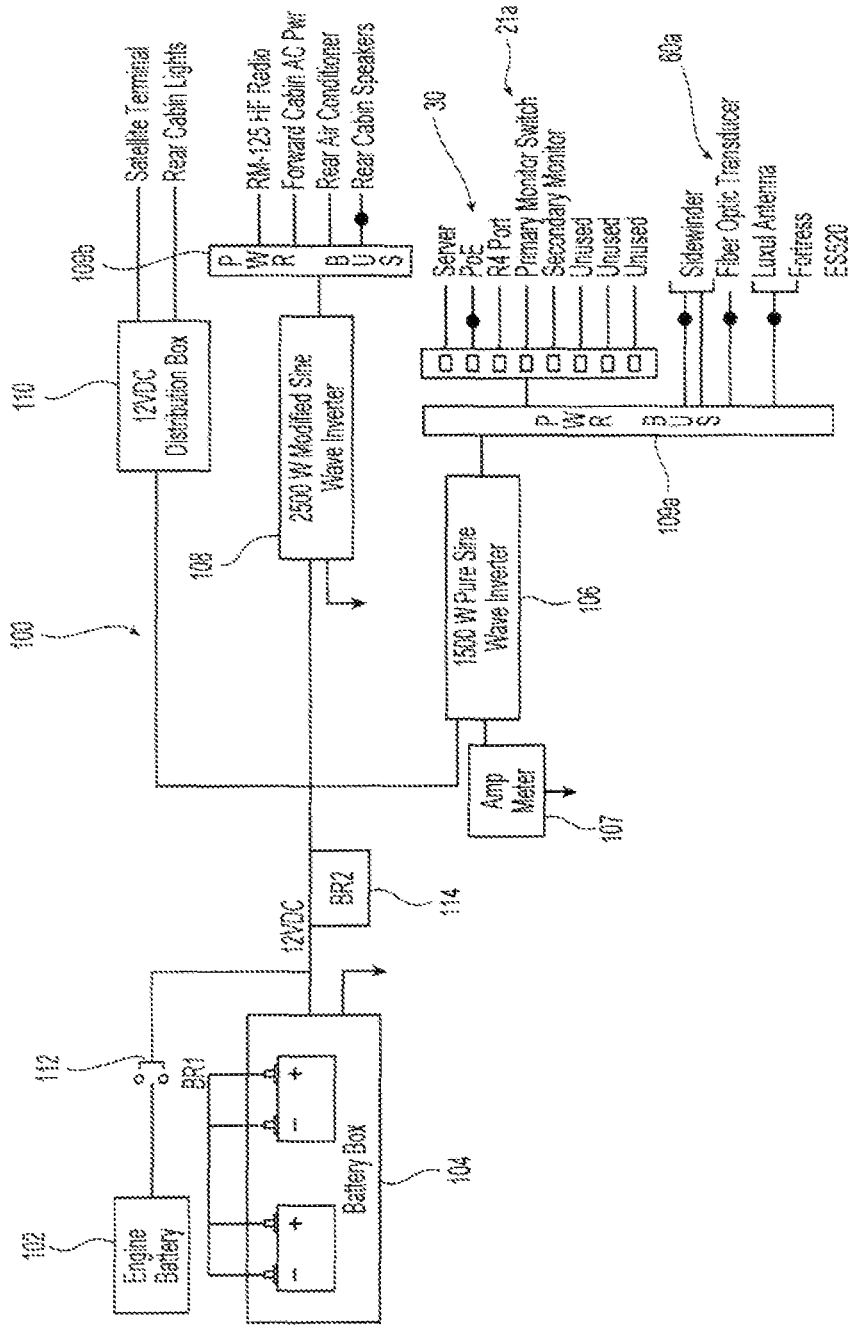
FIG. 5 is a schematic of a preferred power control sub-system for use in the vehicle of FIG. 3.

Given that the preferred communication vehicle is configured for response to remote sites of an emergency or natural disaster, as schematically shown in FIG. 2, the preferred vehicle 10 includes an on-board or internal power supply for operation of the vehicle 10 and its various subsystems. Shown in FIG. 5 is a preferred on-board power sub-system 100. The sub-system preferably includes two DC power sources that preferably include the battery vehicle 102 of the vehicle 10 and a battery bank or box 104. The preferred battery box 104 preferably includes one or more six-cell car batteries and more preferably at least two nominal 12 volt car batteries. The engine battery 102 and battery box 104 provide for a 12 volt DC line preferably coupled to a first inverter 106 for DC-to-AC conversion, a second inverter 108 for DC-to-AC conversion, and a 12 Volt DC distribution box 110. The first inverter 106 is preferably a 1500 Watt pure sine wave inverter to provide a first AC power bus 109a to the server 30, the preferred first and second monitors 21a, and other sensitive equipment 60 of the telecommunication sub-system 40 such as, for example, the preferred moving and stationary cameras described above. The current load of the telecommunications sub-system 40 on the first inverter 106 is preferably no more than about 130 Amps and more preferably no more than about 125 Amps. To protect and monitor the load on the first inverter 106, an Amp meter 107 is provided. Referring again to FIG. 5, the second inverter 108 is preferably a 2500 Watt pure sine wave inverter to provide a second AC power bus 109b to provide less sensitive electrical equipment such as for example, the wireless radios and environmental control equipment described above, i.e., the on board HVAC equipment. The 12 Volt distribution box 110 preferably provides DC power to the preferred broadband satellite terminal described above and other DC power equipment, such as for example, the rear cabin lights. The power sub-system 100 further preferably includes an on-board AC power supply (not shown), such as for example, the HONDA® EU2000i gas powered generator.

The preferred power sub-system further includes a first circuit breaker 112 and a second circuit breaker 114 to alternatively place the engine battery 102 and battery box 104 in parallel and isolated from one another. More specifically, when each of the first and second circuit breakers 112, 114 are closed, the engine battery 102 and battery box 104 are in parallel to provide more amperage to the on-board electronics and permit the alternator of the vehicle 10 to charge both batteries 102, 104 when the vehicle engine is running. In the open state, the first circuit breaker 112 isolates the engine battery from the devices or equipment 60 of the preferred rear cabin 14. The second circuit breaker 114, in the open state, isolates the battery box 104 from the preferred 1500 Watt first inverter 106 and engine batter to prevent "off-line" drainage due to cooling fans of the preferred first inverter 106 which may operate intermittently. The 12 Volt distribution box 110 preferably provides a panel of fused block switches for switching and control of any 12 volt peripheral device or other equipment from any operating station 18, 20 other operating point.

As noted above, the communication vehicle is preferably designed to be deployed to the scene of a disaster or emergency. Accordingly, the mobility of the preferred communications vehicle can enhance and extend the reach of any emergency operations center. Other possible applications include law enforcement surveillance; tactical military command and control; weather and storm chasing; homeland security search and rescue; forward deployment monitoring, news agencies and border patrol. The preferred embodiments of the mobile communication system provide for a communication vehicle platform for effective housing and operation of the communications equipment of the preferred system even when subjected to variable weather, terrain, and other environmental conditions, i.e., noise and vibration, that is anticipated when used in such applications. Moreover, the preferred embodiments described herein provide for power sub-system to effectively power the communication equipment of the preferred system given the possibly limited access to external power in certain applications and the physical and performance limits of the preferred vehicle platform. Furthermore, the preferred embodiments provide for a mobile communication system employing COTS equipment.

While the present invention has been disclosed with reference to certain embodiments, numerous modifications, alterations, and changes to the described embodiments are possible without departing from the sphere and scope of the present invention. Accordingly, it is intended that the present invention not be limited to the described embodiments, but that it has the full scope described and claimed herein and equivalents thereof.

We claim:

1. A mobile communication system comprising:
a vehicle having an interior and an exterior, the vehicle including a wheel and suspension system for ravel over roads at speeds of up to 100 MPH, the vehicle having a front cabin and an enclosed rear cabin separated from the front cabin by a divider;
a central server within the enclosed rear cabin of the vehicle and coupled to a secured wireless network;
a telecommunication sub-system including:
a plurality of IP-based devices coupled to the central server and installed to the exterior of the vehicle, the devices providing for surveillance, recording, and broadcast of video, audio, voice and data, the plurality of devices including at least one camera mounted to the exterior of the vehicle to provide for a 360 degree view around the vehicle for surveillance of a site around the vehicle; and
a plurality of operating stations within the vehicle coupled to the central server for monitoring, operation and control of the devices, the plurality of operating stations including at least one operating station in the front cabin and at least one operating station in the rear cabin, the central server providing for communication between the plurality of operating stations over the secured wireless network,
the plurality of devices including a day/night camera array mounted atop a telescopic mast supported by the enclosed rear cabin, the day/night camera array including:
a mount;
a first camera attached to the mount and configured to provide a fixed view of a designated area;
at least a second camera attached to the mount to provide a mutable view; and
a plurality of sensors attached to the mount to make visual and audio recordings of the fixed and mutable views for continuous wireless streaming of the views,
wherein the mount is a substantially planar member having an upper surface a lower surface, the mount further includes a leg extending from the lower surface of the planar member, the first camera being mounted to the leg so as to be spaced from the planar member, the mount including an extension arm, the at least second camera being mounted on the extension arm so as to be located above the first camera.

2. The system of claim 1, wherein the plurality of devices includes a broadband satellite terminal.

3. The system of claim 1, wherein the plurality of devices includes a Wi-Fi access point providing FIPS 140-2 level encryption.

4. The system of claim 1, wherein the plurality of devices for surveillance includes any of a detection or a sampling device, the device including any one of a directional finder, weather monitor, or thermal, chemical, radiological, or biological sensing device.

5. The system of claim 1, wherein each of the plurality of operating stations includes a control interface device and audio/voice telecommunication equipment.

6. The system of claim 5, wherein the at least one operating station includes one operating station with a headset for command and control of all the devices.

7. The system of claim 1, wherein the IP-based network is remotely accessible for remote monitoring, operation and control of the devices.

8. The system of claim 1, further comprising a power sub-system power the telecommunication sub-system, the power subsystem being housed in the rear cabin and having:
a first DC source and a second DC source operated in parallel to define a DC bus, the first DC source is an engine battery of the vehicle and the second DC source is a battery box having a pair of 12 volt, six cell batteries;
a first inverter coupled to the DC bus for providing AC power to power a first portion of the telecommunication sub-system;
a second inverter coupled to the DC bus for providing AC power to a second portion of the telecommunication sub-system; and
an DC distribution box coupled to the DC bus for powering a third portion of the telecommunication sub-system.

9. The system of claim 1, wherein the wheel and suspension system provide for travel over graveled roads at 60 MPH and cross country roads at 60 MPH.

10. The system of claim 9, wherein the vehicle has at least two axles.

11. A mobile communication system comprising:
a vehicle including a wheel and suspension system for travel over roads at speeds of up to 100 MPH, the vehicle having a front cabin and a rear cabin with a divider between the front and rear cabins, the front cabin including a front portion and a rear portion, the rear cabin defining a rear exterior of the vehicle and the rear cabin being enclosed by an enclosure having two exterior sides;
a telecommunication sub-system including:
a plurality of operating stations including at least one operating station in the front cabin and at least one operating station in the rear cabin;
an IP-based network of devices coupled to a central server, the devices providing for surveillance, recording, and broadcast of video, audio, voice and data, the devices including a plurality of cameras including at least three hemispheric cameras with one hemispheric camera mounted to each exterior side of the cabin and the rear exterior of the vehicle to provide for surveillance of a site around the vehicle;
at least one broadband terminal;
and a plurality of audio and video communication equipment for internal communications between the plurality of operating stations over an internal network of the vehicle and for external communications outside the vehicle; and
a power sub-system enclosed within the rear cabin to power the telecommunication sub-system, the power sub-system having:

a first DC source and a second DC source operated in parallel, one of the first DC source and second DC source being an engine battery of the vehicle; and at least one inverter coupled to at least one of the first and second DC sources for providing AC power to power at least a portion of the telecommunication sub-system, the IP-based network of devices including a day/night camera array mounted atop a telescopic mast supported by the enclosure, the day/night camera array including:

a mount;

a first camera attached to the mount and configured to provide a fixed view of a designated area;

at least a second camera attached to the provide a mutable view; and a plurality of sensors attached to the mount to make visual and audio recordings of the fixed and mutable views for continuous wireless streaming of the views, wherein the mount is a substantially planar member having an upper surface a lower surface, the mount further includes a leg extending from the lower surface of the planar member, the first camera being mounted to the leg so as to be spaced from the planar member, the mount including an extension arm, the at least second camera being mounted on the extension arm so as to be located above the first camera.

12. The system of claim 11, wherein the second DC source is a battery box having a pair of 12 volt, six cell batteries.

13. The system of claim 11, wherein at least one of the telecommunication sub-system and power sub-system can be monitored and controlled from an interface device coupled to the central server.

14. The system of claim 11, wherein the telecommunication sub-system defines a current load of no more than 130 Amps on the at least one inverter.

15. The system of claim 11, wherein the telecommunication sub-system defines a current load of no more than 125 Amps on the at least one inverter.

16. The system of claim 11, wherein the first and second DC sources define a DC bus, the at least one inverter includes a first inverter and a second inverter, the first inverter being coupled to the DC bus for providing AC power to power a first portion of the telecommunication sub-system, the second inverter coupled to the DC bus for providing AC power to a second portion of the telecommunication sub-system; and a DC distribution box coupled to the DC bus for powering a third portion of the telecommunication sub-system.

17. The system of claim 16, wherein the first inverter powers the central server and the plurality of cameras; and the second inverter powers a High Frequency Radio and environmental control equipment of the vehicle.

18. A mobile communication system for hierarchal command and operation, the system comprising:

a vehicle including a wheel and suspension system for travel over roads at speeds of up to 100 MPH, the vehicle having a front cabin and a rear cabin separated by a structural divider, the vehicle having a rear bed and an enclosure disposed over the bed to define the rear cabin, the enclosure including a structural frame with a sheet covering;

a telecommunication sub-system including:

an IP-based network of devices coupled to a central server, the devices providing for surveillance, recording, and broadcast of video, audio, voice and data, the devices including at least one camera externally mounted to the enclosure for surveillance of a site around the vehicle;

a power sub-system for powering the telecommunication sub-system, wherein the rear cabin and the enclosure house the central server and the power sub-system and at least one operating station, the rear cabin and the enclosure including a coating of noise shielding material to define an operating noise level within the vehicle of no more than 90 dBm, the front cabin having a front portion and a rear portion, the front portion of the front cabin including a driver area and an operating station, the rear portion of the front cabin including t least two operating stations, each of the operating stations of the front rear cabin include a control interface device and audio/voice telecommunication equipment coupled with the central server so that the operating stations interact and communicate with one another and the IP-based network of devices, the IP-based network of devices including a day/night camera array mounted atop a telescopic mast supported by the enclosed rear cabin, the day/night camera array including:

a mount;

a first camera attached to the mount and configured to provide a fixed view of a designated area;

at least a second camera attached to the mount to provide a mutable view; and a plurality of sensors attached to the mount to make visual and audio recordings of the fixed and mutable views for continuous wireless streaming of the views, wherein the mount is a substantially planar member having an upper surface a lower surface, the mount further includes a leg extending from the lower surface of the planar member, the first camera being mounted to the leg so as to be spaced from the planar member, the mount including an extension arm, the at least second camera being mounted on the extension arm so as to be located above the first camera.

19. The system of claim 18, wherein the frame and sheet covering of the enclosure includes a structural ribbed frame enclosed by aluminum sheeting, and the coating of noise shielding material includes a layer of polyurethane paint with a thickness of about ⅛ inch.

20. The system of claim 18, wherein the vehicle and telecommunication sub-system are configured to reduce vibration, the vehicle including a wheel and suspension system with HD Nitrogen shock absorbers and a spring rate of payload and sand mobility such that the telecommunication sub-system operates when the vehicle travels over: (i) paved roads at 100 MPH; (ii) graveled roads at 60 MPH; and/or (iii) Cross Country Roads at 60 MPH.

21. The system of claim 18, wherein the vehicle defines an operating noise level at a distance of seven meters (7 m.) of no more than 75 dbA with the operating noise level within the vehicle being less than 65 dBm.

22. The system of claim 18, wherein the enclosure includes a pair of side panels, a canopy and a rear hatch that pivots with respect to the canopy, the canopy defining a height of thirty inches (30 in.) above the sidewalls, the enclosure including at least two sets of externally mounted side rails for externally mounting at least one of the devices providing for surveillance, recording, and broadcast of video, audio, voice and data, the externally mounted devices withstanding winds of up to 100 MPH, the telescopic mast having a maximum height ranging from 13 feet to-20 feet.

23. The system of claim 18, wherein the vehicle is a two-axle, four wheel vehicle and the rear bed is a truck bed of the vehicle.

24. The system of claim 18, further includes a rack server mounted in the vehicle, the rack server including a rack frame having a height of twenty-two inches and a width of twenty-two inches, the rack server defining a rack arrangement including a satellite terminal; a multiple Ethernet port PoE injector; a multi-channel power switch; a multi-panel patch panel and switch, network server, and High Frequency (HF) base station for radio/data communication.

* * * * *